United States Patent [19]

Sawayama et al.

[11] Patent Number: 4,659,544

[45] Date of Patent: Apr. 21, 1987

[54] UNITARY STRUCTURE OF TAG GAS CAPSULE AND END CAP OF NUCLEAR FUEL CLADDING TUBE

[75] Inventors: Takeo Sawayama; Izumi Iimura, both of Naka; Hisaya Miyazaki, Yokohama, all of Japan

[73] Assignee: Doryokuro Kakunenryo Kaihatsu Jigyodan, Tokyo, Japan

[21] Appl. No.: 620,041

[22] Filed: Jun. 12, 1984

[30] Foreign Application Priority Data

Jun. 30, 1983 [JP] Japan ................................ 58-118540

[51] Int. Cl.⁴ .............................................. G21C 3/10
[52] U.S. Cl. .................................. 376/451; 376/450; 376/251; 376/253
[58] Field of Search ................ 376/251, 253, 450, 451

[56] References Cited

U.S. PATENT DOCUMENTS 3,647,622 3/1972 Andrews .............................. 376/451

FOREIGN PATENT DOCUMENTS 54-141990 11/1979 Japan .................................. 376/451

*Primary Examiner*—Donald P. Walsh
*Attorney, Agent, or Firm*—Wenderoth, Lind & Ponack

[57] ABSTRACT

An end cap with a tag gas capsule adapted to close an end of a cladding tube of a nuclear fuel element and to introduce a tag gas into the fuel element. The end cap is fixed to the tag gas capsule to form a unitary structure. The end cap has a specific shape or description on its outer surface corresponding to information concerning the specific tag gas and the capsule, so that the description or shape of the end cap can identify the specific capsule and the tag gas contained in the capsule.

10 Claims, 3 Drawing Figures

UNITARY STRUCTURE OF TAG GAS CAPSULE AND END CAP OF NUCLEAR FUEL CLADDING TUBE

BACKGROUND OF THE INVENTION

The present inventon relates generally to an improvement in an end cap for closing the end of a cladding tube of a nuclear fuel element or rod, and more particularly to an end cap provided with a tag gas capsule connected integrally thereto.

During the operation of nuclear reactors there may be a failure of the nuclear fuel element resulting in release of nuclear fuel material and radioactive fission products to the coolant and ultimately to the environment. Moreover, coolant may enter the failed fuel element and react with the fuel materials, causing further damage. It is therefore important to quickly detect the fuel element failure and determine location of the failed fuel element. One of the known methods for detecting a fuel element failure is by analysis of gases which have previously been introduced into the fuel element. This is called "gas tagging", which method makes use of tag gases (also known as "identifying gases"). Various studies have been made on the kinds of gases that are available as the tag gases, gas detecting devices, and so forth. Some reports teach that rare gases such as, for example, xenon, krypton and their isotopes are suitable for introduction into the fuel elements, either alone or in the form of mixtures of predetermined ratio.

In one prior art method for introducing the tag gas into the fuel element, the tag gas is enclosed and sealed in a capsule provided with means for unsealing the capsule, and the thus formed tag gas capsule is placed in the fuel element. When a certain temperature is reached in the fuel element, the unsealing means operates to release the tag gas enclosed in the capsule into the interior of the fuel element. If a failure of the cladding tube of the fuel element occurs in a reactor core, the tag gas escaped from the fuel element makes it possible to determine the location of the failed fuel element by, for example, a mass spectrometric analysis of a sample from the reactor cover gas.

A problem encountered in a practical application of the gas tagging is how the fuel element and the tag gas capsule loaded in the fuel element are associated or corresponded to each other at the time of manufacture of the fuel element. In the typical conventional fuel element, a fuel cladding tube, a bottom end of which is closed by a lower end cap welded thereto, is filled with a plurality of nuclear fuel pellets, and the tag gas capsule is loaded in an upper plenum of the cladding tube, and then an upper end of the cladding tube is hermetically closed by an upper end cap. Thus, in the prior art, the tag gas capsule is constructed as a member which is separate and independent from the end cap. It is therefore necessary to manually record the correspondence between the fuel element and the tag gas capsule each time when the tag gas capsules are loaded into the fuel elements. In addition, there had to be carried out an X-ray non-destructive inspection after the loading of the tag gas capsule, to examine the state of the capsule loaded in the fuel element. Thus, it involves substantial labour in the recording at the time of loading the capsule and in the non-destructive inspection after the loading. Further, due to the limitation on the accuracy of the non-destructive inspection, the reliability of information obtained through the inspection after the loading is also limited practically.

SUMMARY OF THE INVENTION

An object of the present invention is to provide an improvement of an end cap of a cladding tube and a tag gas capsule which overcomes the above-described disadvantages of the conventional structure.

Another object of the present invention is to provide a combination of an end cap and a tag gas capsule, which does not necessitate recordation for correspondence between the nuclear fuel element and the tag gas capsule loaded therein, and which allows a reduction of labour in the non-destructive inspection after loading of the tag gas capsule.

According to the present invention, there is provided a unitary structure of an end cap and a tag gas capsule in which the tag gas capsule is integrally connected with the end cap. The end cap has an outer surface on which information about the tag gas contained in the tag gas capsule is indicated. Alternatively, the end cap has a specific shape for identifying the information concerning the tag gas in the tag gas capsule.

The tag gas capsule is connected by welding or the like to the inner end portion of the end cap which faces the interior of a cladding tube of a fuel element. The thus formed tag gas capsule with the end cap is inserted into the cladding tube, and then the end cap is hermetically welded to the cladding tube.

The tag gas capsule to be combined with the end cap according to the present invention may have various constructions such as, for example, one making use of the characteristics of springs made of a shape-memory alloy, as well as one making use of the characteristics of a fusible seal made of a metal or alloy having a low melting point.

BRIEF DESCRIPTION OF THE DRAWINGS

The accompanying drawings illustrate preferred embodiments of the present invention and, together with the description, serve to explain the principle of the invention.

DETAILED DESCRIPTION OF THE PREFERRED EMBODIMENTS

Figure 1:
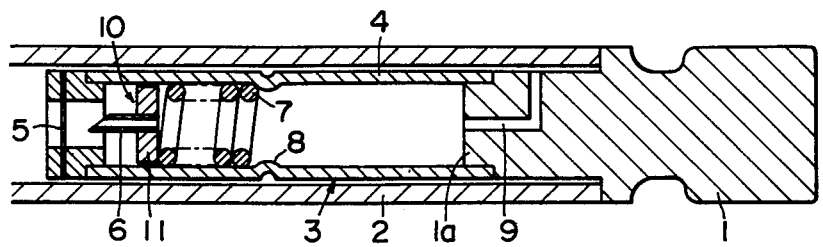
FIG. 1 is a sectional view of an end cap combined with a tag gas capsule to form a unitary structure which is inserted into a fuel cladding tube of a nuclear fuel element, illustrating a first embodiment of the invention.
Figure 2:
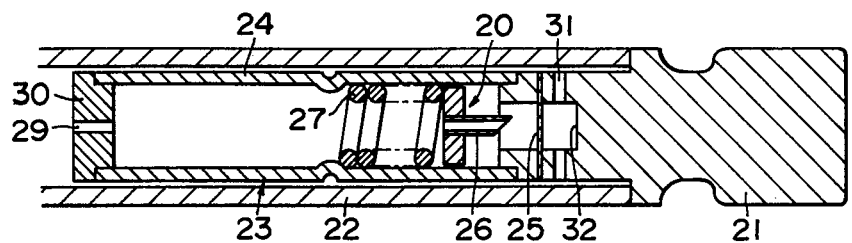
FIG. 2 is, similarly to FIG. 1, a sectional view of the combined structure of the end cap and tag gas capsule adapted to the cladding tube, showing a second embodiment of the invention.
Figure 3:
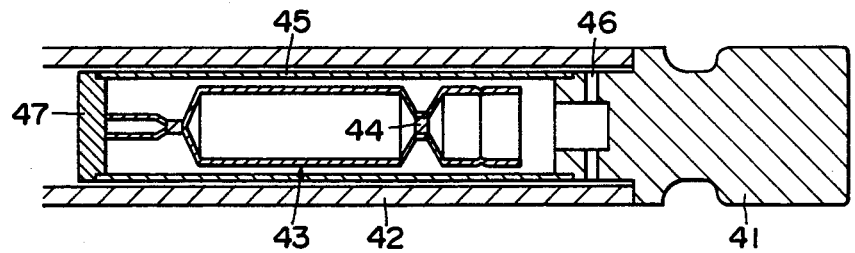
FIG. 3 is, similarly to the previous figures of the drawing, a sectional view of the combined structure of the end cap and the tag gas capsule adapted to the similar cladding tube, showing a third embodiment of the invention.

The present invention will be described with reference to the preferred embodiments shown in FIGS. 1 through 3. FIGS. 1 and 2 illustrate examples of end cap combined with tag gas capsules of the type employing a shape-memory alloy as shaped into a spiral spring which have memorized expanding or extended status in its beta phase and which are compressed in its martensite phase to be installed in the capsules, and FIG. 3 shows an example combined with a tag gas capsule of the type which is closed off by a fusible seal and placed within a container which is fixed to an end cap.

Referring first to the embodiment of FIG. 1, an end plug or cap 1 is fixed at its inner end portion 1a to a tag gas capsule 3. The tag gas capsule 3 illustrated in FIG. 1 has a substantially cylindrical tube 4 having one end connected to the end cap 1 and the other end delimited hermetically by a thin membrane or diaphragm 5. Within the tag gas capsule 3 is disposed a punch or penetrator 10 in a spaced confronting relation with respect to the diaphragm 5. The penetrator 10 for puncturing the diaphragm 5 has, in the illustrated embodiment, a pointed projection or hollow pipe 6 with its end cut slantwise as shown, and an spiral spring 7, as a driving device for driving the pointed projection 6 against the diaphragm 5. The spiral spring 7 is made of a shape-memory alloy which has memorized a predetermined expanding condition in its beta phase and which has been compressed in its martensite phase to be installed in the capsule 3. One end of the spring 7 is engaged with an annular base 11 of the pointed projection 6 and the other end is anchored at an inner projection 8 formed at a predetermined place of the cylindrical tube 4 of the tag gas capsule 3 by a drawing technique. The pointed projection 6 in the form of a hollow pipe serves as a passage through which the tag gas flows when the diaphragm 5 is ruptured by the penetrator 10.

The end cap 1 is provided with a passage 9 for filling therethrough tag gas into the tag gas capsule 3. As illustrated, the passage 9 is connected to the inside of the capsule 3 and the outside of the capsule. The passage 9 is sealed by, for example, a laser welding technique after the tag gas is filled in the capsule 3 through the passage 9. At this moment, information as to the filled tag gas end and the tag gas capsule is confirmed and marked accordingly on the outer surface of the end cap 1. Alternatively, various different shapes of end caps may be prepared and then a specific one may be used in accordance with the information concerning the capsule and the tag gas therein. The information as to the tag gas capsule 3 includes, for example, the fabrication conditions of the capsule, date of fabrication, place of fabrication, etc., so that these data may be expected to become some aids for seeking causes when a failure of the capsule is found in the operation. The thus formed tag gas capsule 3 fixed to the end cap 1 is inserted into a fuel cladding tube 2 of the nuclear fuel element, and then the end cap 1 is hermetically welded to the cladding tube 2. To unseal a tag gas capsule, it has only to be heated above the critical temperature of the shape-memory alloy. Due to the heating, the driving device in the form of the spiral spring 7 expands and drives the pointed projection 6 against the diaphragm 5 to rupture the same so that the tag gas in the capsule 3 is released out of the tag gas capsule 3 but within the fuel cladding tube 2 of the fuel element.

The shape-memory alloy of the spring 7 is not limited particularly, but from the view point of the corrosion resistance and neutron economy, it is preferable to use a nickel-titanium alloy, so-called Nitinol, which has an advantage that the critical temperature can be controlled by adequately selecting its composition.

FIG. 2 shows a modified end cap according to the present invention in which the end cap is connected with another type of the tag gas capsule using a spiral spring of the shape-memory alloy. End cap 21 is connected to a tag gas capsule 23 to form a unitary structure. In the structure of FIG. 2, the tag gas capsule 23 is first assembled. The capsule 23 has a substantially cylindrical tube 24 and is sealed at its one end with a plug 30 having an aperture 29 for gas insertion. At the other end of the capsule 23, a penetrator 20 having a pointed projection 26 and a spiral spring 27 of a shape-memory alloy is disposed, so that the pointed projection 26 is in a spaced confronting relation with the end cap 21. The end cap in the embodiment of FIG. 2 has a concavity 32 for receiving the pointed projection 26 and a thin diaphragm 25 at the through the concavity 32. Reference numeral 31 represents a passage for discharging the tag gas out of the capsule but within the fuel cladding tube 22 when the pointed projection 26 is driven against the diaphragm 25 to rupture the same. The end cap 21 is fixed to the capsule 23 by welding or the like to provide a unitary structure. The predetermined tag gas is filled in the tag gas capsule 23 through the aperture 29, of the plug 30 and thereafter the aperture 29 is sealed by, for example, a laser welding. At this time, data as to the tag gas and the capsule 23 are confirmed and indicated on the outer surface of the end cap 21. Alternatively, the shape of the end cap 21 may be matched to the information on the tag gas and the capsule. The end cap 21 is then engaged with the cladding tube 22 in such a manner that the tag gas capsule 33 is inserted into and located within the cladding tube 22 by welding or the like.

Unsealing of the capsule 23 is carried out similarly to that of the structure of FIG. 1. When temperature of the nuclear fuel element is elevated above the critical temperature of the employed shape-memory alloy of the spiral spring 27, the spring 27 expands to drive the pointed projection 26 to rupture the thin diaphragm 25. Thus, the tag gas in the capsule 23 is discharged out of the capsule through the tag gas discharging passage 31 and a longitudinal space defined between an inner surface of the fuel cladding tube 22 and an outer surface of the capsule 23 along the length of the capsule.

FIG. 3 shows still another embodiment of the invention, in which a tag gas is closed off by a fusible seal 44 in a tag gas capsule 43, and the tag gas capsule 43 is positioned and secured within a cylindrical tube or a container 45. The container 45 is connected with, by suitable technique such as welding or screwing, an end cap 41 which has a tag gas discharging passage 46. Reference numeral 47 is a closure plug which closes one end of the container 45 and holds the tag gas capsule 43 in position. After the end cap 41 is fixed to the container 45, an indication is made on the outer surface of the end cap 41, as to the information concerning the tag gas capsule 43 and of the tag gas in the capsule. Then the tag gas capsule container 45 is inserted into the fuel cladding tube 42, which is similar to those of the previous embodiments, and the end cap 41 is hermetically sealed to the fuel cladding tube 42 by, for example, welding. The tag gas capsule 43 employed in the illustrated embodiment has a fusible seal 44 for closing the capsule. The fusible seal 44 is of materials e.g. low melting metals or alloys having a melting point below the temperature of coolant in the reactor during the reactor operation, so that the tag gas is released into the interior of the fuel element at the above described temperature through the passage 46 and a space between the cladding tube 42 and the container 45. The tag gas capsule 43 shown in FIG. 3 is known as disclosed in U.S. Pat. No. 3,957,576 to Boyer et al., and a further description of the capsule structure in FIG. 3 will not be made.

As has been described, according to the present invention, there is provided an end cap with a tag gas capsule wherein the tag gas capsule in integrally connected to the inner end of the end cap body closing one end of a fuel cladding tube. Therefore, after assembly the tag gas capsule is contained within the fuel cladding tube and, hence, is invisible. However, since information on the tag gas within the tag gas capsule is marked on the outer surface of the end cap body which is integral with the capsule, it is possible to obtain information on the tag gas and the tag gas capsule by checking the markings on the end cap, or the shape of the end cap. This principle can be applied even when a lot of different tag gases are used, provided that suitable markings and cap shapes are selected to clarify the correspondences between the different tag gases and the fuel elements.

Thus, according to the present invention, information on the tag gas and the tag gas capsule matches to markings on the end cap bodies, or the shapes of the end cap bodies, when tag gas capsules or tag gas capsule containers are integrated with the end caps, so that it is not necessary to manually record the correspondence between the fuel elements and the tag gas capsules therein. In addition, it is possible to easily obtain information on the tag gases and the tag gas capsules by checking the marking on the end caps, or the shapes of the end caps, even after the tag gas capsules have been inserted into the fuel elements and sealed therein by, for example, welding. This reduces the labour in the non-destructive inspection after the loading of the tag gas capsules in the fuel elements.

Although the present invention has been described with reference to the preferred embodiments, many modifications and alterations may be made within the spirit of the invention.

What is claimed is:

1. An end cap and tag gas device for closing an end of a cladding tube of a nuclear fuel element and for introducing tag gas into the fuel element, comprising:
    an end cap body hermetically sealable to the cladding tube for closing an end of the cladding tube by welding said end cap body to an end of the cladding tube; and
    a tag gas capsule for sealingly containing tag gas therein, said capsule being connected integrally to said end cap body to form a unitary structure and so as to be inserted in the cladding tube when said end cap body is welded to the end of the cladding tube;
    said capsule including means, responsive to an elevated temperature of the fuel element in a nuclear reactor, for unsealing said capsule without the application of an external force to said capsule so as to allow tag gas in the capsule to escape therefrom;
    said end cap body having an exposed outer surface having indicia indicative of information concerning the tag gas in said tag gas capsule.

2. A device according to claim 1, wherein said tag gas capsule has a substantially cylindrical tube having one end connected to said end cap body, a thin diaphragm hermetically delimiting the other end of the cylindrical tube, and a penetrator disposed in a spaced confronting relation with said thin diaphragm for puncturing said diaphragm, said penetrator having a hollow pipe including a free end cut slantwise and a spiral spring for driving said hollow pipe to penetrate said diaphragm, said spiral spring being made of a shape-memory alloy.

3. The device according to claim 2, wherein said penetrator has an annular base member for securing said hollow pipe in position, one end of said spiral spring being engaged with said annular base member, and said cylindrical tube has an inner projection for securing the other end of said spiral spring.

4. The device according to claim 2, wherein said end cap body has a passage for filling therethrough the tag gas into said tag gas capsule, said passage being sealable after the tag gas is filled in said capsule.

5. The device according to claim 1, wherein said tag gas capsule has a substantially cylindrical tube having one end connected to said end cap body, a plug member for sealing the other end of said cylindrical tube when a tag gas is filled therein, and a penetrator having a hollow pipe with its end cut slantwise and a spiral spring made of a shape-memory alloy for driving said hollow pipe toward said end cap body,
    wherein said end cap body has a recess for receiving said hollow pipe when said pipe is driven, a thin diaphragm for hermetically sealing said recess, said diaphragm being disposed in a spaced confronting relation with said hollow pipe, and a passage, communicated to said recess, for discharging the tag gas out of said tag gas capsule when said thin diaphragm is ruptured by said hollow pipe.

6. The device and according to claim 1, wherein said tag gas capsule has a fusible seal for closing said capsule, and wherein said end cap body has a cylindrical container connected thereto with its one end and a gas discharging passage, the other end of said cylindrical container is closed with a plug which also serves said tag gas capsule in position within said container.

7. A device as in claim 1, further comprising a quantity of tag gas sealed in said capsule.

8. A device as in claim 1, wherein said capsule has a sealable opening for injecting the tag gas therein.

9. A device as in claim 1, wherein said indicia is printed on said surface.

10. A device as in claim 1, wherein said indicia is defined by the shape of said surface.

* * * * *